(12) United States Patent
Cupido et al.

(10) Patent No.: US 10,792,749 B1
(45) Date of Patent: Oct. 6, 2020

(54) WELDING TOOL

(71) Applicant: Supreme Group LP, Acheson (CA)

(72) Inventors: Wilfred Jerome Cupido, Edmonton (CA); John Leder, Spruce Grove (CA)

(73) Assignee: Supreme Group LP, Acheson, Alberta (CA)

( * ) Notice: Subject to any disclaimer, the term of this patent is extended or adjusted under 35 U.S.C. 154(b) by 0 days.

(21) Appl. No.: 16/372,311

(22) Filed: Apr. 1, 2019

(51) Int. Cl.
*B23K 9/02* (2006.01)

(52) U.S. Cl.
CPC ...................... *B23K 9/02* (2013.01)

(58) Field of Classification Search
CPC ........ B23K 9/02; B23K 20/10; B23K 20/106; B23K 37/0217; B23K 37/027; B23K 9/201; B23K 9/206
USPC ...... 219/136, 125.1, 125.11, 124.34, 124.01, 219/137.2
See application file for complete search history.

(56) References Cited

U.S. PATENT DOCUMENTS

| | | |
|---|---|---|
| 2,930,883 A | 3/1960 | Adamec et al. |
| 3,064,120 A | 11/1962 | Ache |
| 3,345,494 A | 10/1967 | Apblett, Jr. et al. |
| 3,594,534 A | 7/1971 | Benfield |
| 5,239,154 A | 8/1993 | Puls |
| 5,726,417 A * | 3/1998 | Claussen ............ B23K 37/0217 219/125.11 |
| 6,768,082 B2 * | 7/2004 | Aoyama ................ B23K 9/201 219/125.11 |

FOREIGN PATENT DOCUMENTS

| | | |
|---|---|---|
| GB | 942238 A | 11/1963 |
| KR | 101741457 B1 | 5/2017 |

* cited by examiner

*Primary Examiner* — Phuong T Nguyen
(74) *Attorney, Agent, or Firm* — Venable LLP; Michele V. Frank (57) ABSTRACT

A welding tool includes a tool support and a welding torch coupled to the tool support. The welding tool is configured to rotate relative to the tool support about a welding axis. A locating device is coupled to the tool support and is movable between a retracted position and an extended position. In the extended position, the locating device extends toward the welding axis. The locating device includes a recess at an end of the locating device. The recess is configured such that, when a predetermined object to be welded (such as an anchor rod) is positioned at least partially within the recess of the locating device in the extended position, the welding axis passes through the object to be welded.

15 Claims, 10 Drawing Sheets

WELDING TOOL

FIELD OF THE DISCLOSURE

The present disclosure relates to a welding tool and to a method of using a welding tool.

BACKGROUND TO THE DISCLOSURE

Welding torches are used to weld together metal objects. When many welds are required, for example for large construction projects, it can be laborious and time consuming for a human to repetitively produce many welds of a consistently high quality. In addition, requiring a human to produce a large number of such welds may lead to mobility, health, and/or ergonomics issues. Although the ability to produce multiple welds of a consistently high quality has been automated to some extent, such automated devices are typically not easily portable, and the objects to be welded generally have to be brought to the welding device for welding.

SUMMARY OF THE DISCLOSURE

According to a first aspect of the disclosure, there is provided a welding tool comprising: a support structure; a welding torch coupled to the support structure and configured to rotate relative to the support structure about a welding axis; and a locating device coupled to the support structure and movable between a retracted position and an extended position in which the locating device extends toward the welding axis, wherein the locating device comprises a recess at an end thereof and is configured such that, when an object to be welded is positioned at least partially within the recess of the locating device in the extended position, the welding axis passes through the object to be welded.

Thus, with the welding tool described above, multiple welds surrounding anchor rods (or other suitable objects to be welded) may be rapidly and accurately produced. The welding tool may be operated by a labourer (a qualified welder is ideally not required).

The welding torch may be rotatably coupled to the support structure so as to rotate about the welding axis.

The recess may be sized and/or shaped such that, when the object to be welded is positioned at least partially within the recess of the locating device in the extended position, the welding axis passes through the object to be welded.

The recess may comprise a triangular shape.

The locating device may be configured to rotate between the retracted position and the extended position. The locating device may be further configured to translate toward and away from the welding axis.

The support structure may comprise one or more magnets for securing the welding tool to a work surface. The magnets may be provided in a base of the support structure.

An angle of the welding torch relative to the welding axis may be adjustable.

The support structure may comprise a base with a central aperture formed therein. In the extended position, the locating device may extend into the central aperture.

The locating device may comprise a first portion coupled to the support structure and a second portion extending at an angle (e.g. a non-horizontal angle) to the first portion, and the recess may be formed within the second portion. When the locating device is in the extended position, the second portion may extend through the central aperture.

The second portion may comprise a first member extending at an angle (e.g. a non-horizontal angle) to the first portion and a second member extending at an angle (e.g. a non-horizontal angle) to the first member. The recess may be formed within the second member. When the locating device is in the extended position, the second member may extend perpendicular to the welding axis.

The object to be welded may comprise an anchor rod. In some embodiments, the object to be welded may comprise any other suitable object, such as a circular plate.

The welding tool may further comprise a controller configured to implement a method comprising: activating the welding torch; rotating the welding tool about the welding axis; and deactivating the welding torch. For example, the controller may be communicatively coupled to the welding torch so as to cause the welding torch to activate and deactivate. The controller may furthermore control one or more motors or similar devices for causing the welding tool to rotate about the welding axis. For example, the motors may cause a rotatable element of the support structure, to which the welding tool is coupled, to rotate relative to the support structure.

The welding tool may be portable by a user. For example, it may be possible to relocate the welding tool manually, without the need for a hoist or lift.

According to further aspect of the disclosure, there is provided a welding tool comprising: a support structure; a welding torch coupled to the support structure and configured to rotate relative to the support structure about a welding axis; and a locating device coupled to the support structure and rotatable between a retracted position and an extended position in which the locating device extends toward the welding axis, wherein the locating device is configured such that, when an object to be welded is positioned in contact with an end of the locating device in the extended position, the welding axis passes through the object to be welded.

The welding tool may comprise any of the features described above in connection with the first aspect of the disclosure.

According to further aspect of the disclosure, there is provided a system comprising: any of the above-described welding tools; and a controller configured to implement a method comprising: activating the welding torch; rotating the welding torch about the welding axis; and deactivating the welding torch. The method may further comprise moving the locating device from the extended position to the retracted position prior to activating the welding torch. Moving the locating device from the extended position to the retracted position may comprise translating the locating device away from the welding axis and rotating the locating device relative to the support structure.

The method may further comprise moving the locating device from the retracted position to the extended position after deactivating the welding torch. For example, the controller may control one or more motors or similar devices for causing the locating device to move between the retracted position to the extended position.

The method may further comprise, prior to moving the locating device from the extended position to the retracted position, activating the one or more magnets comprised in the support structure.

The method may further comprise, prior to activating the welding tool, rotating the welding tool about the welding axis.

The controller may comprise: circuitry; or a processor communicative with memory having stored thereon computer program code configured when executed by the processor to cause the processor to implement the method.

The system may comprise any of the features described above in connection with the first aspect of the disclosure.

In a further aspect of the disclosure, there is provided a method of welding, comprising: providing any of the above-described welding tools; when the locating device is in the extended position, positioning the object to be welded in contact with the end of the locating device such that the welding axis passes through the object to be welded; moving the locating device to the retracted position; activating the welding torch; and rotating the welding torch about the welding axis so as to weld the object to be welded.

BRIEF DESCRIPTION OF THE DRAWINGS

Embodiments of the disclosure will now be described in conjunction with the accompanying drawings of which.

DETAILED DESCRIPTION OF EMBODIMENTS

The present disclosure seeks to provide an improved welding tool and method of using such a welding tool. While various embodiments of the disclosure are described below, the disclosure is not limited to these embodiments, and variations of these embodiments may well fall within the scope of the disclosure which is to be limited only by the appended claims.

The word "a" or "an" when used in conjunction with the term "comprising" or "including" in the claims and/or the specification may mean "one", but it is also consistent with the meaning of "one or more", "at least one", and "one or more than one" unless the content clearly dictates otherwise. Similarly, the word "another" may mean at least a second or more unless the content clearly dictates otherwise.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through one or more intermediate elements or devices via an electrical element, electrical signal or a mechanical element depending on the particular context. The term "and/or" herein when used in association with a list of items means any one or more of the items comprising that list.

As used herein, a reference to "about" or "approximately" a number or to being "substantially" equal to a number means being within +1-10% of that number.

Generally, according to embodiments of the disclosure, there is described an automated welding tool. The welding tool includes a welding torch configured to rotate about a welding axis, and a locating device (which may also be referred to as a centering leg) used to position an object to be welded (which according to embodiments may be an anchor rod) on the welding axis. The welding tool may incorporate multiple bracing pillars on rubber feet to provide a stable structure that has sufficient weight to remain in place throughout rotation of the welding torch. At one end thereof, the centering leg includes a tailored recess or notch for properly aligning the anchor rod on the welding axis, thereby ensuring that the welding torch has a consistent line into the joint.

The welding torch may be provided at an adjustable angle and a pre-set elevation relative to the base of the support structure, and may be configured to rotate around the centre of the structure. The weld may be performed in one direction of rotation and then in the other, thus ensuring that no kinks arise in the welding cable that would result in wire feeding issues. After placement of the anchor rod into the recess of the centering leg, but prior to the welding sequence, the centering leg automatically retracts into an upright position to allow free rotation of the welding torch.

Figure 1:
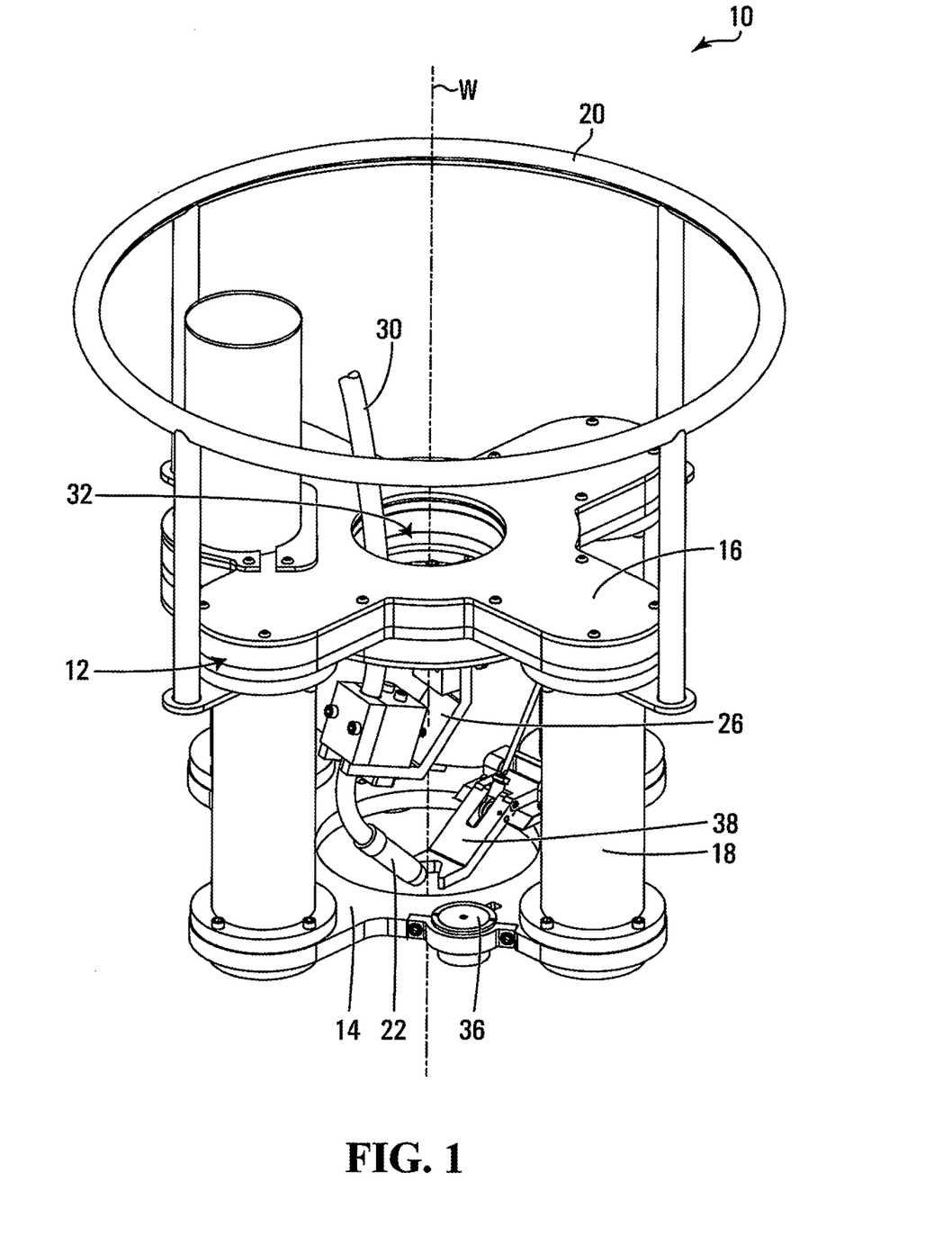
FIG. 1 is a schematic diagram of a welding tool according to embodiments of the disclosure.
Figure 2:
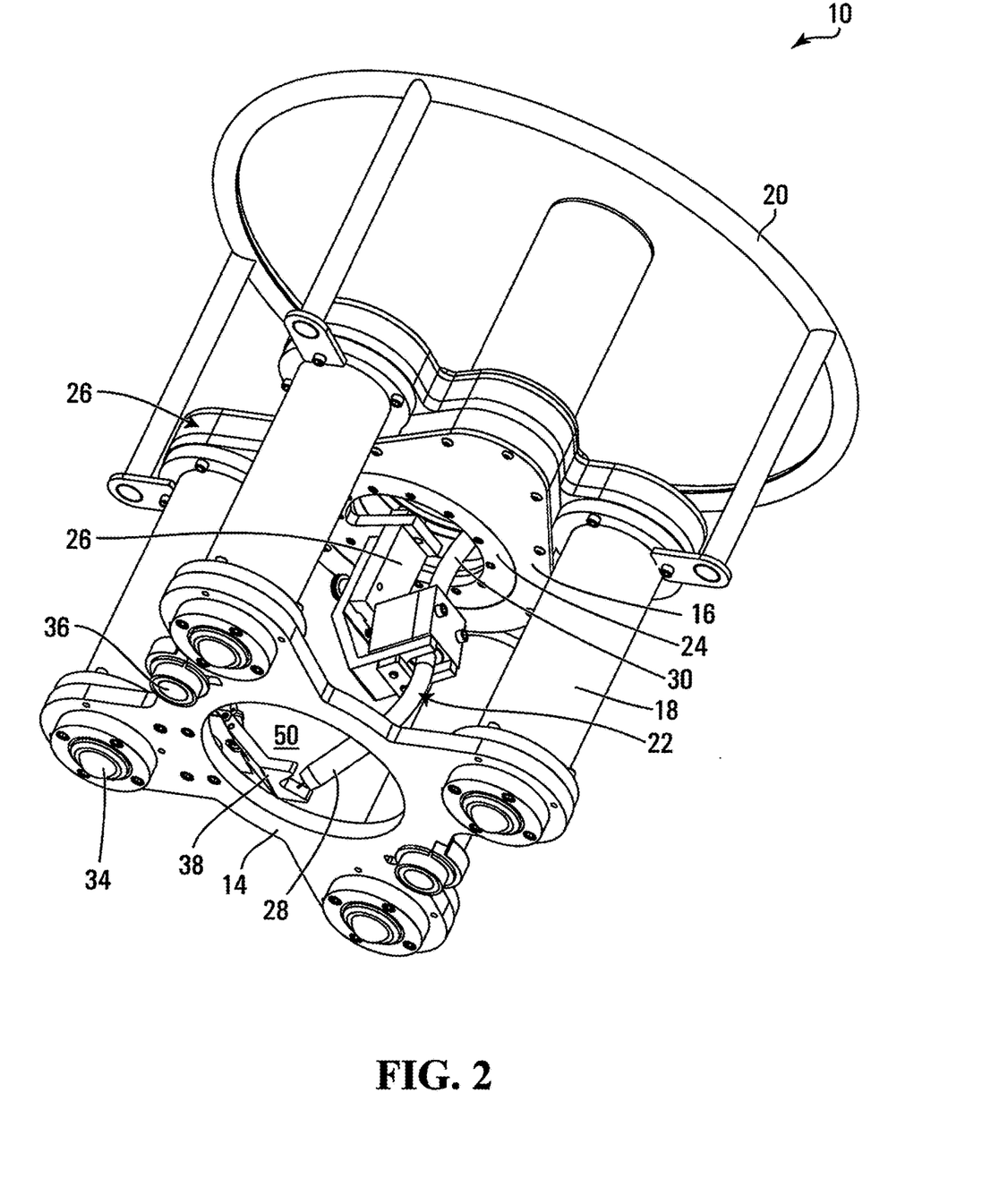
FIG. 2 is a view of an underside of the welding tool of FIG. 1.

The figures will now be described in more detail. Turning to FIG. 1, and according to embodiments of the disclosure, welding tool 10 comprises a tool support structure 12 including a base 14, an upper support 16, and multiple bracing pillars 18 extending from base 14 to upper support 16. A circular handle 20 extends upwardly from upper support 16. Welding tool 10 further includes a welding torch 22 rotatably coupled to upper support 16 by means of a rotator 24 and a torch support 26. Rotator 24 and torch support 26 are shown in more detail in FIG. 2 which shows an underside of welding tool 10. Rotator 24 is configured to allow welding torch 22 to rotate through 360 degrees about a welding axis W passing through the centre of welding tool 10. Welding torch 22 comprises a torch body 28 joined to a welding cable 30 extending through a central aperture 32 formed within upper support 16. As can be seen in FIG. 2, the underside of bracing pillars 18 include rubber feet 34, and magnets 36 are provided within base 14.

Figure 3:
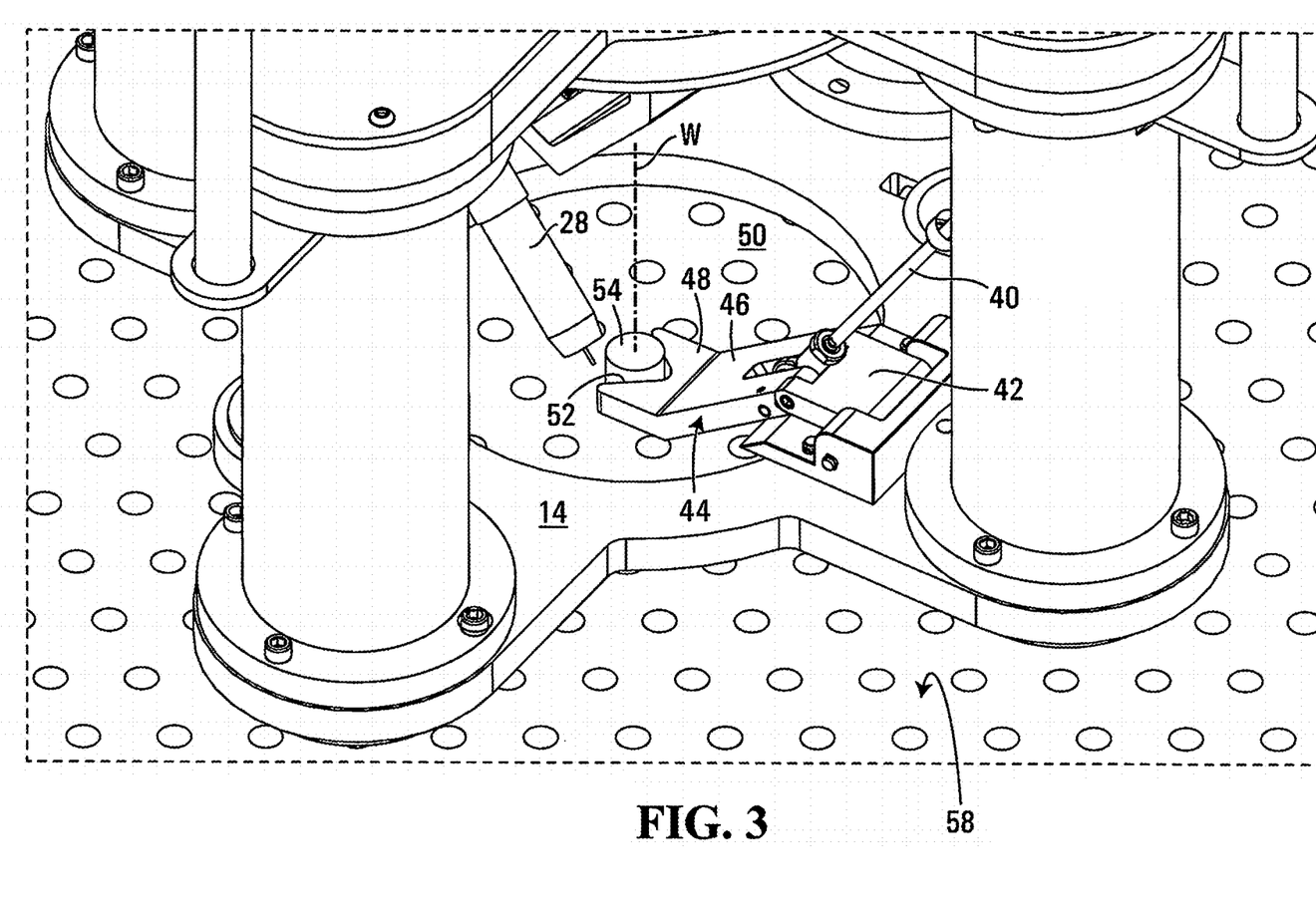
FIG. 3 shows a centering leg in an extended position, according to embodiments of the disclosure.
Figure 4:
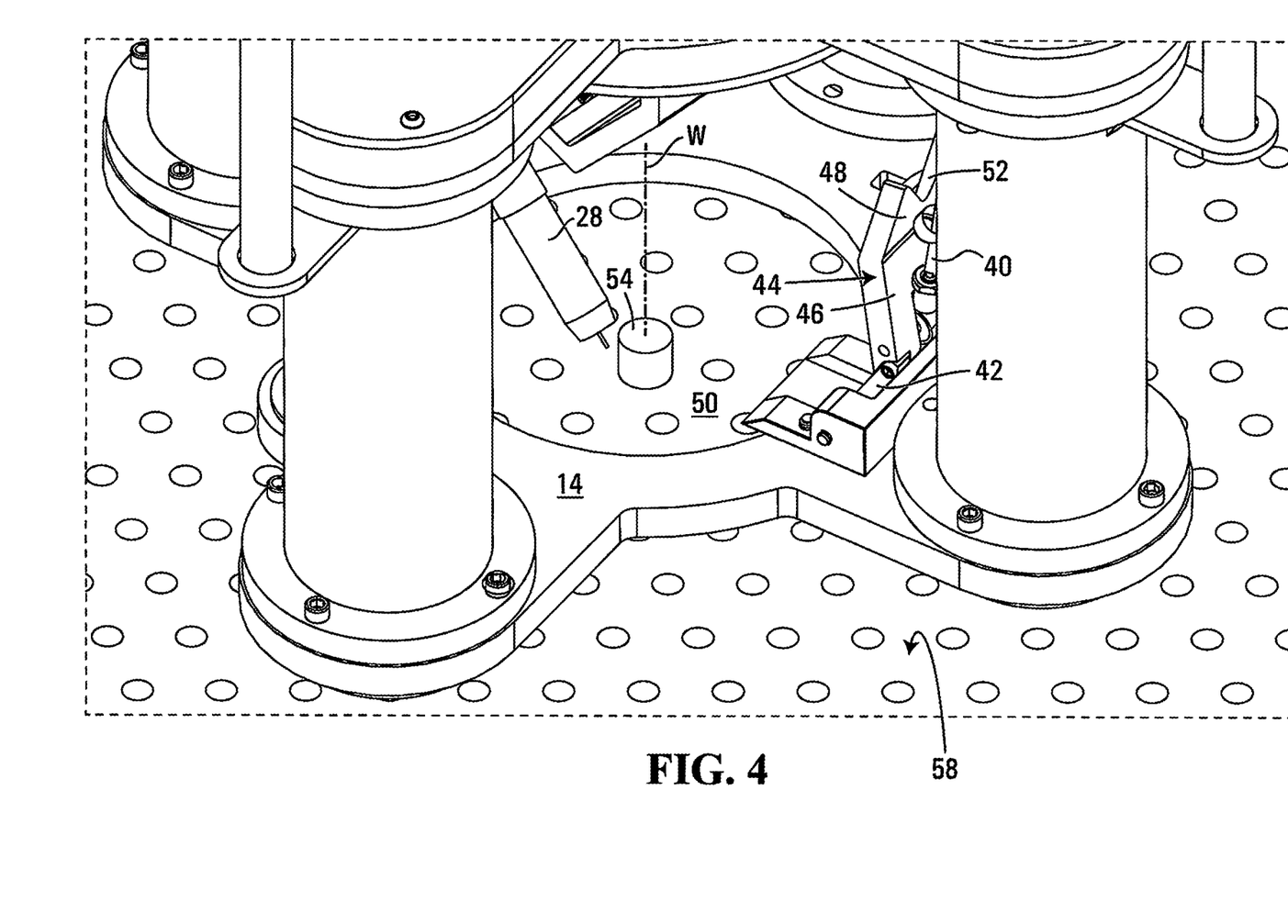
FIG. 4 shows the centering leg of FIG. 3 in a retracted position.

Welding tool 10 further includes a locating device, or centering leg 38, shown in more detail in FIGS. 3 and 4. Centering leg 38 is rotatably coupled to tool support structure 12. In particular, welding tool 10 includes an actuable arm 40 configured to move centering leg 38 between an extended position and an upright, retracted position. The extended position of centering leg 38 can be seen in more detail in FIG. 3, and the retracted position of centering leg 38 can be seen in more detail in FIG. 4. Centering leg 38 includes a first portion 42 rotatably attached to base 14, and a second portion 44 rotatable relative to first portion 42. Second portion 44 includes an angled extension 46 extending away from first portion 42 at a downward angle thereto, and an end portion 48 extending away from angled extension 46 at an angle thereto. End portion 48 is substantially parallel to first portion 42. In the extended position, centering leg 38 extends through a central aperture 50 formed within base 14.

End portion 48 of centering leg 38 includes a recess or notch 52 formed therein. Notch 52 comprises generally a triangular shape at the end of centering leg 38, although the skilled person will recognize that the disclosure extends to recesses having other suitable shapes. Notch 52 is sized such that, when an anchor rod 54 is positioned within notch 52 and in contact with the sides of notch 52, welding axis W passes through the centre of anchor rod 54.

Figure 5:
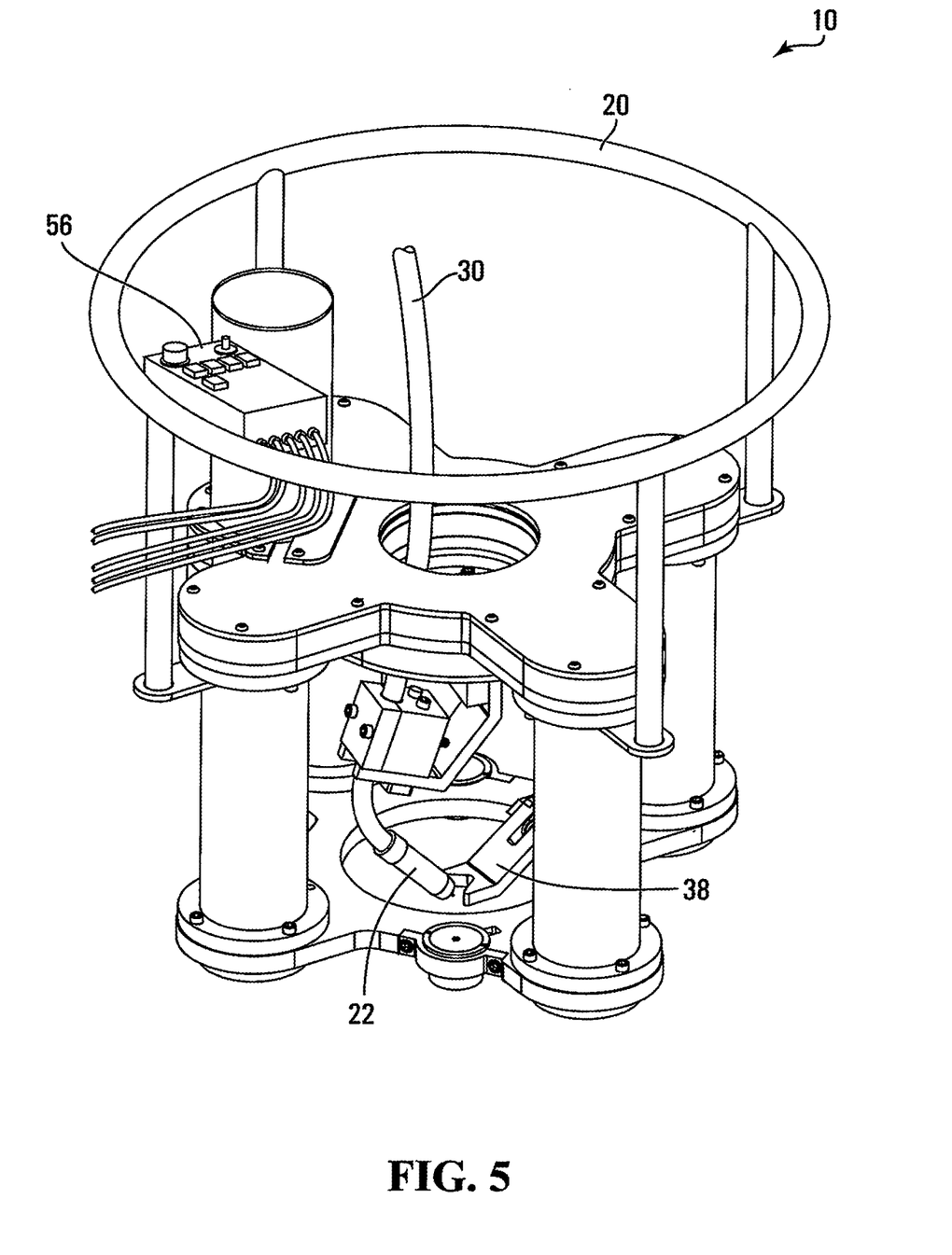
FIG. 5 shows a welding tool according to embodiments of the disclosure.

Turning to FIG. 5 which shows welding tool 10 according to embodiments of the disclosure, welding tool 10 includes a controller 56 for controlling operation of welding tool 10. In particular, controller 56 includes circuitry configured to enable welding tool 10 to perform various actions. For example, controller 56 may activate magnets 36 in order for welding tool 10 to be secured to a metallic work surface 58 (FIGS. 3 and 4). Controller 56 may additionally control the extension and retraction of centering leg 38, as well as the rotation of rotator 24 relative to upper support 16. Furthermore, controller 56 may control activation and deactivation of welding torch 22. In some embodiments, instead of or in addition to circuitry, controller 56 may comprise a processor communicative with memory having stored thereon computer program code configured, when executed by the processor, to cause the processor to implement one or more of the above functions. Further still, in some embodiments controller 56 may be provided independently of welding tool 10, and controller 56 may be configured for example to control welding tool 10 remotely.

Figure 6:
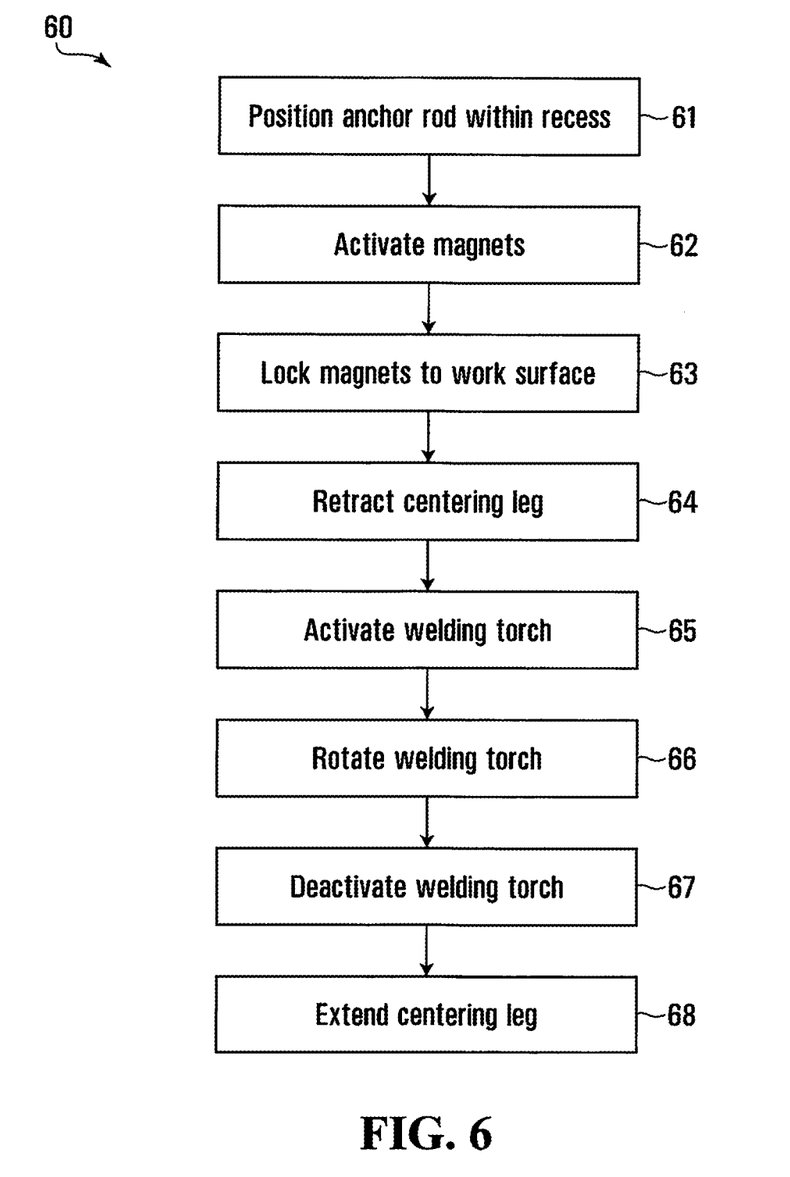
FIG. 6 is a flow diagram of a method of using a welding tool, according to embodiments of the disclosure.

Turning to FIG. 6, according to embodiments of the disclosure there is shown a method 60 of performing welding, using welding tool 10. Centering leg 38 is initially in the extended position. At block 61, welding tool 10 is positioned over the anchor rod 54 to be welded. In particular, anchor rod 54 is located within notch 52 of centering leg 38 and is positioned in contact with the sides of notch 52. At block 62, a user uses controller 56 to activate magnets 36. Once magnets 36 are activated, at block 63, the user may then push downwardly on welding tool 10, using handle 20. Through the downward force applied to welding tool 10, rubber feet 34 compress and magnets 36 approach metal work surface 58 until welding tool 10 is securely engaged to work surface 58. Controller 56 is then used to initiate a welding sequence, as follows. In particular, at block 64, controller actuates arm 40 to rotate centering leg 38 into the retracted position. At block 65, controller 56 activates welding torch 22. At block 66, controller 56 rotates welding torch 22 to form the joint between anchor rod 54 and work surface 58. In some embodiments, welding torch 22 is rotated through an angle of greater than 360 degrees (in some embodiments, 368 degrees). This enables the start of the weld to be filled. At block 67, controller 56 deactivates welding torch 22. Rotator 24 may then rotate welding torch 22 back to its original position, to ensure that no kinks develop in welding cable 30. At block 68, controller 56 actuates arm 40 to rotate centering leg 38 into the extended position, for subsequent welding.

In some embodiments, a user may use controller 56 to rotate welding torch 22 a predetermined amount, for example prior to welding. This allows a user to determine the point at which welding torch 22 begins welding.

Experimental Results

Figure 7:
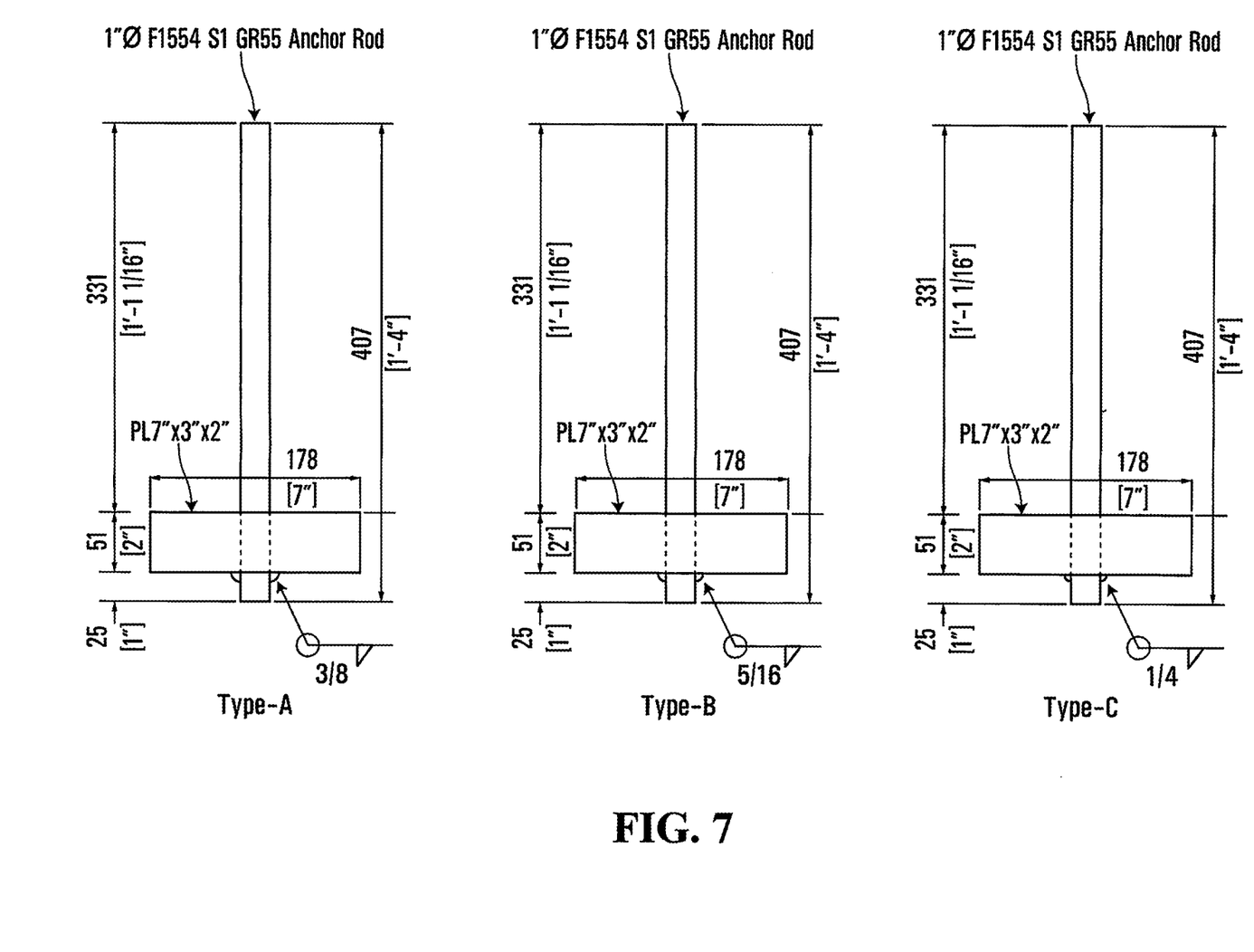
FIG. 7 shows schematic diagrams of different welds.

Three different welds were initially considered, as set out below and as shown in FIG. 7.
1. ⅜" [10 mm] fillet weld (Type-A);
2. ⁵⁄₁₆" [8 mm] fillet weld (Type-B); and
3. ¼" [6 mm] fillet weld (Type-C).

Three separate specimens were originally considered for three test types (a total of nine tests) using a ⅜" all-around fillet weld (Type A), a ⁵⁄₁₆" fillet weld (Type B) and a ¼" fillet weld (Type C) for the anchor rod to plate connection. A heavy, 2" plate was used to simulate the concrete-filled core backing the shell plate.

Testing was run to failure, with all Type A and Type B specimens exhibiting yielding to fracture failure, while two of three Type C connections exhibited the same failure behavior. One Type C (¼" weld) had the weld fracture and rod pull through the plate. This was a result of both minimum weld material and heat input. In summary, the 6 mm (¼") fillet weld was of adequate size to satisfy the structural requirements of the anchor rod fillet weld, but given the travel speed during welding necessary to generate the smaller fillet weld size, it is unrealistic to produce consistent penetration profiles at these speeds.

The 8 mm (⁵⁄₁₆") fillet option provides an improved compromise between welding efficiency and a consistent weld that meets the structural requirements. A manually welded 8 mm fillet weld underwent mechanical testing, showing that the failure upon tensile testing occurs within the anchor rod, exhibiting a traditional necking to failure mechanism. An example of the 8 mm fillet weld produced by the welding tool can be seen in FIG. 8.

Eight rod specimens welded using the automated welding tool were completed, four using metal-cored arc welding (MCAW) and another four using flux-cored arc welding (FCAW). The welding parameters and information regarding the consumables and welding processes for the test samples are shown in Table 1.

Figure 8:
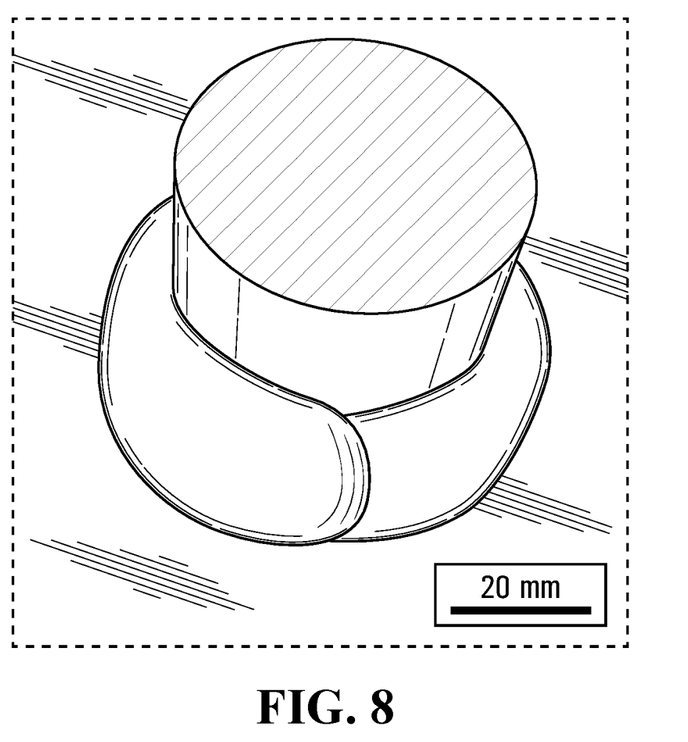
FIG. 8 shows an 8 mm fillet weld.
Figure 9:
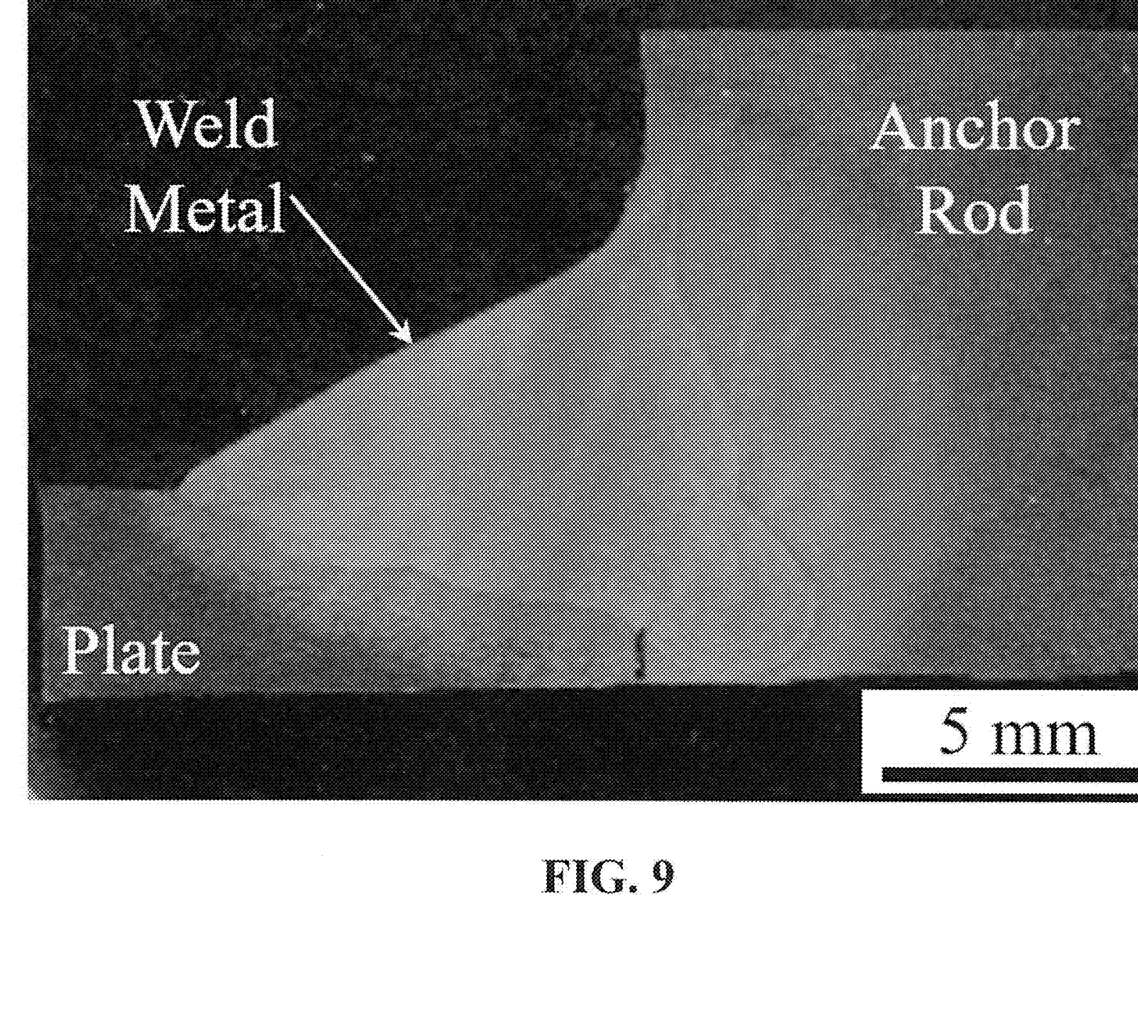
FIG. 9 shows a penetration profile of a weld.

FIG. 8 shows a representative example of a weld produced using the automated welding tool. The use of the 1.6 mm electrode allowed for increased welding efficiency and increased the current level as compared to the 1.3 mm wire which in turn led to a deeper penetration profile. The deeper penetration profile can be seen in FIG. 9. It was observed that for welds with insufficient penetration profiles, the failure mode of the anchor rod specimens still occurred within the rod, but occurred at the top of the anchor rod, in close proximity to the weld.

TABLE 1

Welding parameters for test samples and process/consumable information.

| Sample # | Wire Feed Speed m/min [pm] | Voltage V | Travel Setting | Process | Wire | Wire Dia. mm |
|---|---|---|---|---|---|---|
| 1 | 7.62 [300] | 32 | 25 | MCAW | E491C-6MJ-H4 E70C-6M-H4 | 1.6 |
| 2 | 7.62 [300] | 32 | 25 | MCAW | E491C-6MJ-H4 E70C-6M-H4 | 1.6 |
| 3 | 7.62 [300] | 32 | 25 | MCAW | E491C-6MJ-H4 E70C-6M-H4 | 1.6 |
| 4 | 7.62 [300] | 32 | 25 | MCAW | E491T-6MJ-H4 E71T-6M-JH4 | 1.6 |
| 5 | 8.89 [350] | 28 | 18/19 | FCAW | E491T-9MJ-H8 E71T-9M-JH8 | 1.6 |
| 13 | 8.89 [350] | 28 | 18/19 | FCAW | E491T-9MJ-H8 E71T-9M-JH8 | 1.6 |
| 15 | 8.89 [350] | 28 | 18/19 | FCAW | E491T-9MJ-H8 E71T-9M-JH8 | 1.6 |
| 18 | 8.89 [350] | 28 | 18/19 | FCAW | E491T-9MJ-H8 E71T-9M-JH8 | 1.6 |

Figure 10:
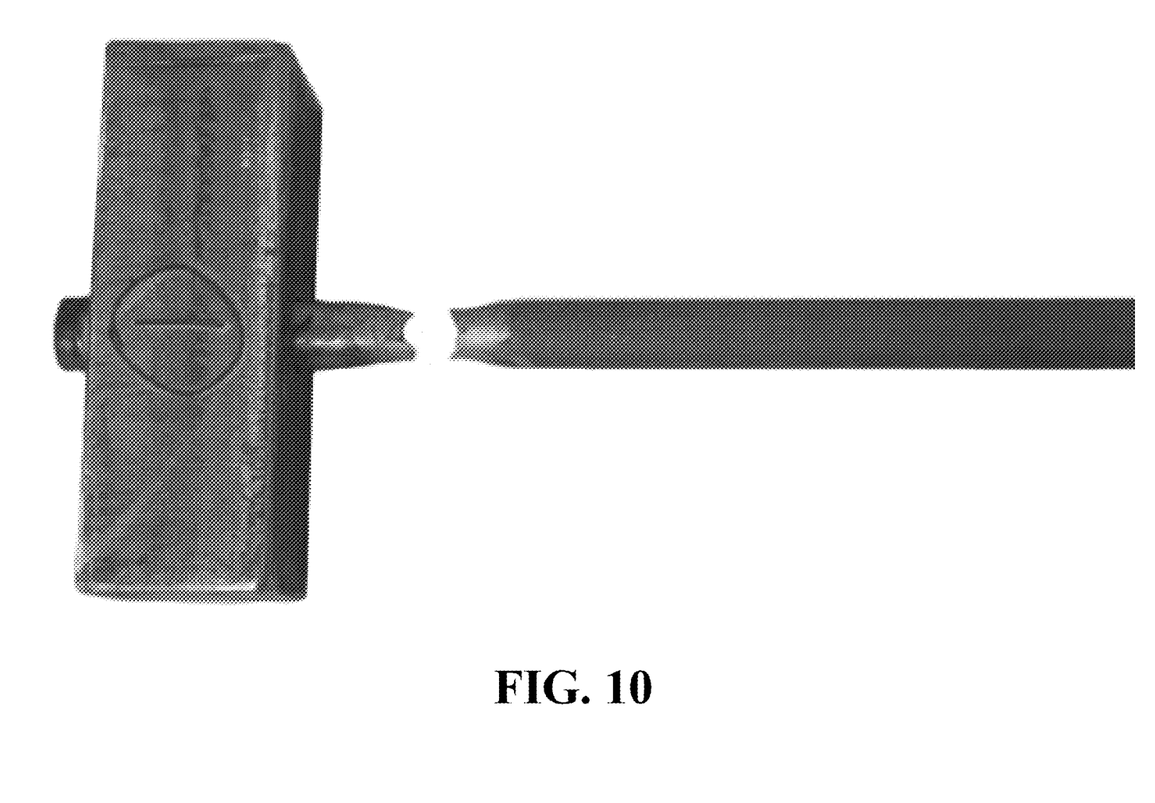
FIG. 10 shows a result of a pull test.

In four pull tests on the rod setup with both metal-cored arc welding MCAW and flux-cored arc welding FCAW, in all cases the failure occurred in the rod and the weld remained unaffected. These results clearly show that the 8 mm fillet weld generated with the automated welding tool is robust and consistent. An example of the pull test results is shown in FIG. 10.

Based on the results of tension testing and the consistency of the welds produced, the automated welding tool has been shown to provide a satisfactory weldment, particularly with the MCAW process. The use of the 1.6 mm consumable allowed for a significant (~50%) reduction in the welding time for one anchor rod. The deep penetration profile and consistent outer weld profile indicate that this process can effectively provide reliable results.

While the disclosure has been described in connection with specific embodiments, it is to be understood that the disclosure is not limited to these embodiments, and that alterations, modifications, and variations of these embodiments may be carried out by the skilled person without departing from the scope of the disclosure. It is furthermore contemplated that any part of any aspect or embodiment discussed in this specification can be implemented or combined with any part of any other aspect or embodiment discussed in this specification.

The invention claimed is:

1. A welding tool comprising:
   a support structure comprising one or more magnets for securing the welding tool to a work surface;
   a welding torch coupled to the support structure and configured to rotate relative to the support structure about a welding axis, wherein the welding axis is defined by rotation of the welding torch relative to the support structure;
   a locating device coupled to the support structure and movable between a retracted position and an extended position in which the locating device extends toward the welding axis, wherein in the extended position an end of the locating device is closer to the welding axis than in the retracted position, wherein the locating device comprises a recess at the end and is configured such that, when an object to be welded is positioned at least partially within the recess of the locating device in the extended position, the welding axis passes through the object to be welded; and
   a controller, comprising at least one of a processor and circuitry, configured to implement a method comprising:
   activating the one or more magnets;
   moving the locating device from the extended position to the retracted position;
   activating the welding torch;
   rotating the welding torch about the welding axis; and
   deactivating the welding torch.

2. The welding tool of claim 1, wherein the recess comprises a triangular shape.

3. The welding tool of claim 1, wherein the locating device is configured to rotate between the retracted position and the extended position.

4. The welding tool of claim 1, wherein an angle of the welding torch relative to the welding axis is adjustable.

5. The welding tool of claim 1, wherein the support structure comprises a base with a central aperture formed therein.

6. The welding tool of claim 5, wherein, in the extended position, the locating device extends into the central aperture.

7. The welding tool of claim 1, wherein the locating device comprises a first portion coupled to the support structure and a second portion extending at an angle to the first portion, and wherein the recess is formed within the second portion.

8. The welding tool of claim 7, wherein, when the locating device is in the extended position, the second portion extends through a central aperture.

9. The welding tool of claim 7, wherein the second portion comprises a first member extending at an angle to the first portion and a second member extending at an angle to the first member, wherein the recess is formed within the second member, and wherein, when the locating device is in the extended position, the second member extends perpendicular to the welding axis.

10. The welding tool of claim 1, wherein the object to be welded comprises an anchor rod.

11. The welding tool of claim 1, wherein the welding tool is portable by a user.

12. The welding tool of claim 1, wherein the moving of the locating device from the extended position to the retracted position occurs prior to activating the welding torch.

13. The welding tool of claim 12, activating of the one or more magnets occurs prior to moving the locating device from the extended position to the retracted position.

14. The welding tool of claim 1, wherein the method further comprises moving the locating device from the retracted position to the extended position after deactivating the welding torch.

15. The welding tool of claim 1, wherein the method further comprises, prior to activating the welding torch, rotating the welding torch about the welding axis.

* * * * *